(12) United States Patent
Hughes (10) Patent No.: US 11,168,606 B2
(45) Date of Patent: Nov. 9, 2021

(54) TURBINE

(71) Applicant: Cummins Ltd, London (GB)

(72) Inventor: Stephen David Hughes, Huddersfield (GB)

(73) Assignee: Cummins Ltd, London (GB)

( * ) Notice: Subject to any disclaimer, the term of this patent is extended or adjusted under 35 U.S.C. 154(b) by 0 days.

(21) Appl. No.: 16/765,701

(22) PCT Filed: Nov. 23, 2018

(86) PCT No.: PCT/GB2018/053388
§ 371 (c)(1),
(2) Date: May 20, 2020

(87) PCT Pub. No.: WO2019/102205
PCT Pub. Date: May 31, 2019

(65) Prior Publication Data
US 2020/0300158 A1 Sep. 24, 2020

(30) Foreign Application Priority Data

Nov. 24, 2017 (GB) .................................... 1719585

(51) Int. Cl.
*F02B 37/02* (2006.01)
*F01D 9/02* (2006.01)

(52) U.S. Cl.
CPC ............ *F02B 37/025* (2013.01); *F01D 9/026* (2013.01); *F05B 2220/40* (2013.01); *F05B 2240/123* (2013.01)

(58) Field of Classification Search
CPC .... F01D 9/026; F02B 37/025; F05B 2220/40; F05B 2240/123; F05D 2220/40; Y02T 10/12
See application file for complete search history.

(56) References Cited

U.S. PATENT DOCUMENTS 3,664,761 A * 5/1972 Zastrow .................. F01D 9/026
415/205
6,709,235 B2 * 3/2004 Hosny ................... F02B 37/025
415/205
(Continued)

FOREIGN PATENT DOCUMENTS

DE 102013223778 A1 8/2014
EP 2048326 A2 9/2008
(Continued)

OTHER PUBLICATIONS

Translation EP2048326 , Schleusener, Michael; Apr. 15, 2009.*
(Continued)

*Primary Examiner* — Jesse S Bogue
(74) *Attorney, Agent, or Firm* — Faegre Drinker Biddle & Reath LLP (57) ABSTRACT

A turbine comprises a housing defining a turbine chamber with a turbine wheel supported for rotation about an axis. The housing further defines first and second inlet volutes which each spiral radially inwards and extend from a respective inlet to adjoin the turbine chamber and a volute tongue for each inlet volute. The tongue of the first volute radially separating a downstream portion of the first volute adjacent the chamber from an upstream portion of the first volute adjacent said inlet of the first volute, and the tongue of the second volute radially separating a downstream portion of the second volute adjacent the chamber from an upstream portion of the second volute adjacent said inlet of the second volute. The tongues having a turbine scroll tongue overlap which is substantially zero or positive; and the first volute tongue is angularly spaced about the axis from the second volute tongue.

5 Claims, 7 Drawing Sheets

(56) References Cited

U.S. PATENT DOCUMENTS

| | | | | |
|---|---|---|---|---|
| 9,845,770 | B2* | 12/2017 | Martinez-Botas | F02B 33/40 |
| 9,874,222 | B2* | 1/2018 | Yoshida | F02C 6/12 |
| 10,280,833 | B2* | 5/2019 | Gugau | F01D 5/14 |
| 10,302,007 | B2* | 5/2019 | Erdel | F02B 37/001 |
| 10,858,986 | B2* | 12/2020 | Yoshida | F02B 37/183 |
| 2015/0013330 | A1 | 1/2015 | Kindl et al. | |
| 2017/0183975 | A1 | 6/2017 | Ausbrooks | |
| 2021/0140366 | A1* | 5/2021 | Williams | F01D 17/143 |

FOREIGN PATENT DOCUMENTS

| | | | |
|---|---|---|---|
| EP | 2233720 | A1 | 9/2010 |
| EP | 2803839 | A1 | 10/2012 |
| EP | 3085888 | A1 | 11/2016 |

OTHER PUBLICATIONS

International Search Report and Written Opinion issued by the European Patent Office, dated Feb. 12, 2019, for International Application No. PCT/GB2018/053388; 9 pages.

Search Report issued by the United Kingdom Intellectual Property Office, dated May 17, 2018, for related Application No. GB1719585.0; 3 pages.

International Preliminary Report on Patentability received for PCT Patent Application No. PCT/GB2018/053388, dated Jun. 4, 2020, 7 pages.

* cited by examiner

TURBINE

CROSS-REFERENCE TO RELATED APPLICATIONS

The present application is a National Stage Application under 35 USC § 371 of PCT Application No. PCT/GB2018/053388, filed Nov. 23, 2018, which claims priority to U.K. Application No. 1719585.0, filed Nov. 24, 2017, the entire disclosures of which being hereby expressly incorporated herein by reference.

FIELD OF THE DISCLOSURE

The present disclosure relates to a turbine, and, in particular, to a twin-entry turbine in which the tongues of each volute are angularly staggered. The turbine may form part of a turbocharger.

BACKGROUND OF THE DISCLOSURE

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of a rotor driven by a fluid to do useful work, for example, generating electrical power; and a compressor which uses the rotational energy of the rotor to compress a fluid.

Turbochargers are well known turbomachines for supplying air to an inlet of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold.

The turbocharger shaft is conventionally supported by journal and thrust bearings, including appropriate lubricating systems, located within a central bearing housing connected between the turbine and compressor wheel housings. After driving the turbine wheel the exhaust gas exists the turbine through a gas outlet which is at the opposite end of the rotational axis of the turbine wheel from the bearing housing.

It is well-known for the multiple cylinders of an internal combustion engine to be portioned into two groups of cylinders, and for the exhaust gas emitted by the respective groups of cylinders to be transmitted into two respective gas inlets of a turbocharger. The gas inlets are in fluid communication with a chamber of the housing containing the turbine wheel via respective volutes. In the case of twin-entry volutes the volutes are spaced from each other along the rotational axis of the turbine wheel, such that a first of the volutes is closer to the bearing housing (the "bearing housing side volute"—BH), and the other is closer to the turbine outlet side (the "turbine outlet side volute"—TO). In the case of double-entry volutes, the volutes may be circumferentially-spaced from each other about the rotational axis of the turbine wheel. The term "full admission" refers to the assumption that gas in both of the turbine entries have equal mass flow rates and pressures. However, the reality is that the two gas inlets in fact receive different mass flow rates and inlet pressures (a phenomenon called "partial admission"). Furthermore, flow entering each volute is unsteady, and the exhaust gas entering one volute may have different pressure wave form from that gas entering the other volume, which is furthermore out of phase with gas entering the other volute.

Because each of the volutes is not rotationally symmetric, the pressure experienced by the turbine wheel is a non-uniform distribution dependant on the angular position of the turbine wheel. In some turbines it is possible for a turbine wheel operating at a particular speed to have one or more of its blades, having a particular resonant frequency, be excited by component frequency orders of the pressure distribution. The greater the amplitude of the excitation, the greater the strain exerted by the exhaust gas on the blades of the turbine wheel. Too much strain exerted on the blades of the turbine wheel over time can result in the blades of the turbine wheel becoming deformed (e.g. suffering from metal fatigue) and, in extreme cases, in blades of the turbine wheel fracturing—and hence catastrophic failure of the turbine.

SUMMARY OF THE DISCLOSURE

According to a first aspect of the disclosure there is provided a turbine comprising a housing defining a turbine chamber within which a turbine wheel is supported for rotation about a first axis; the housing further defining first and second inlet volutes which each spiral radially inwards and extend from a respective inlet to adjoin the turbine chamber; wherein the housing further defines a volute tongue for each of the first and second inlet volutes, the tongue of the first inlet volute radially separating a downstream portion of the first inlet volute adjacent the turbine chamber from an upstream portion of the first inlet volute adjacent said inlet of the first inlet volute, and the tongue of the second inlet volute radially separating a downstream portion of the second inlet volute adjacent the turbine chamber from an upstream portion of the second inlet volute adjacent said inlet of the second inlet volute; wherein the tongues of each of the first and second inlet volutes have a turbine scroll tongue overlap which is substantially zero or positive; and the tongue of the first inlet volute is angularly spaced about the first axis from the tongue of the second inlet volute.

Ensuring that the tongues of each of the first and second inlet volutes have a turbine scroll tongue overlap which is substantially zero or positive results in the tongue position being substantially performance transparent. This may be of particular benefit when applying the disclosure to an existing design of turbine (or to a new turbine wheel at risk of blade fatigue, perhaps due to a specific geometry chosen to optimise the thermodynamic performance but known to otherwise compromise durability), the performance of which you do not want to change.

Angularly spacing the tongue of the first inlet volute about the first axis from the tongue of the second inlet volute results in a change in the turbine wheel leading edge pressure distribution (as compared to a known turbine in which the tongue of the first inlet volute and the tongue of the second inlet volute are substantially angularly aligned) which results in a reduction in the strain experienced by the turbine wheel due to the exhaust gas, when the turbine is operating at a particular speed. This reduction of strain experienced by the turbine wheel may result in an increased operating lifetime of the turbine wheel.

The tongue of the first inlet volute may have a turbine scroll tongue overlap which is substantially zero. The tongue of the second inlet volute may have a turbine scroll tongue overlap which is positive.

The first and second inlet volutes may be spaced from one another along the first axis.

The second inlet volute may be located at a turbine outlet end of the turbine relative to the first inlet volute.

The tongue of the first inlet volute may be angularly spaced about the first axis from the tongue of the second inlet volute by about 35°. The angular spacing (about the first axis) between the tongue of the first inlet volute and the tongue of the second inlet volute may be in one of the following ranges: 30° to 40°, 20° to 50°, 10° to 60°, 0° to 90° or 0° to 45°.

According to a second aspect of the disclosure there is provided a turbocharger comprising a turbine according to the first aspect of the disclosure.

BRIEF DESCRIPTION OF THE DRAWINGS

A non-limiting embodiment of the disclosure will now be described, for the sake of example only, with reference to the following figures, in which.

DETAILED DESCRIPTION OF THE EMBODIMENTS

Figure 1:
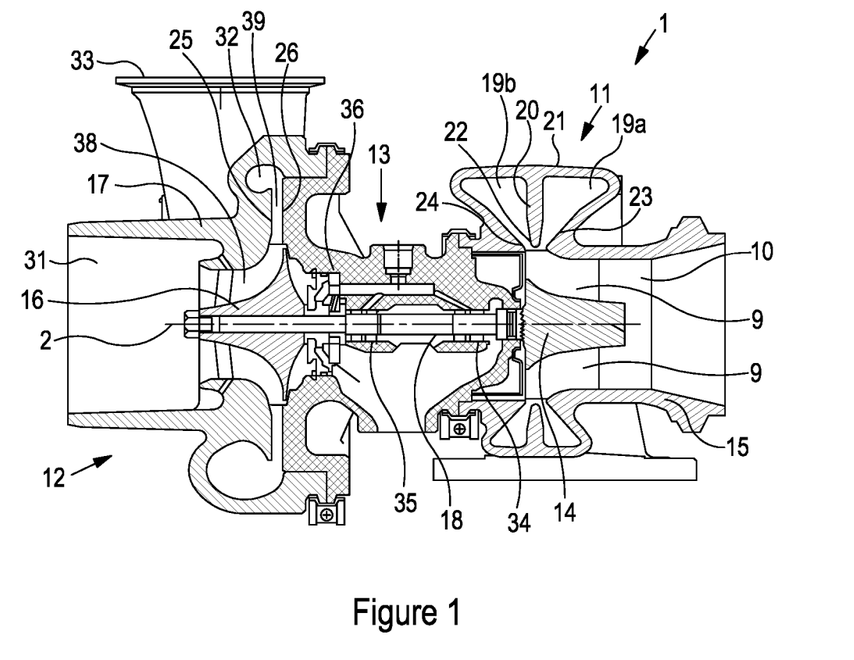
FIG. 1 is a cross-sectional drawing of a known turbocharger.

FIG. 1 shows a schematic cross-section through a known turbocharger 1. The turbocharger 1 comprises a turbine 11 joined to a compressor 12 via a central bearing housing 13. The turbine 11 comprises a turbine wheel 14 for rotation within a turbine housing 15. The turbine wheel 14 has a rotational axis 2 (in the plane of the diagram) and blades 9. Similarly, the compressor 12 comprises a compressor wheel 16 (or "impeller") which can rotate within a compressor housing 17. The compressor housing 17 defines a compressor chamber 38 which is largely filled by the compressor wheel 16, and within which the compressor wheel 16 can rotate. The turbine wheel 14 and compressor wheel 16 are mounted on opposite ends of a common turbocharger shaft 18 which extends through the central bearing housing 13.

The turbocharger shaft 18 is rotatably supported by a bearing assembly in the bearing housing 13 which comprises two journal bearings 34 and 35 housed towards the turbine end and compressor end respectively of the bearing housing 13. The bearing assembly further includes a thrust bearing 36.

The turbine housing 15 has two exhaust gas inlet volutes 19a, 19b located annularly around the turbine wheel 14, and an axial exhaust gas outlet 10. The volutes 19a, 19b are symmetrical with respect to each other in a mirror plane perpendicular to the axial direction. The compressor housing 17 has an axial air intake passage 31 and a volute 32 arranged annularly around the compressor chamber 38. The volute 32 is in gas flow communication with a compressor outlet 33. The compressor chamber 38 is connected to the volute 32 by a radially-extending diffuser space 39 (also referred to here as a "diffuser") which is a gap between a radially-extending shroud surface 25 of the housing 17, and a radially extending hub surface 26 of the bearing housing 13. The diffuser 39 is rotationally symmetric about the rotational axis 2 of the shaft 18.

In use, exhaust gas is provided to the two exhaust gas inlet volutes 19a, 19b from an exhaust manifold (also referred to as an outlet manifold) of the engine (not shown in FIG. 1) to which the turbocharger is attached. The inlet volutes 19a, 19b are divided by a divider wall 20 which extends radially inwardly from the radially outer wall 21 of the turbine housing 15, to a tip 22. The exhaust gas exits the inlet volute 19a through a gap between the tip 22 of the divider wall 20 and a first shroud surface 23 of the turbine 11. The exhaust gas exits volute 19b through a gap between the tip 22 of the divider wall 20 and a second shroud surface 24 of the turbine 11. Thus, the exhaust gas passes from the exhaust gas inlet volutes 19a, 19b to the exhaust gas outlet 10 via a turbine wheel 14, which is rotated by the exhaust gas. In some variants, the second shroud 24 surface may be provided as a surface of the bearing housing or some other component, instead of being a surface of the turbine housing 15.

The turbine wheel 14 in turn rotates the compressor wheel 16 which thereby draws intake air through the compressor inlet 31 and delivers boost air to an inlet manifold of the engine via the diffuser 39, the volute 32 and then the outlet 33.

Figure 2:
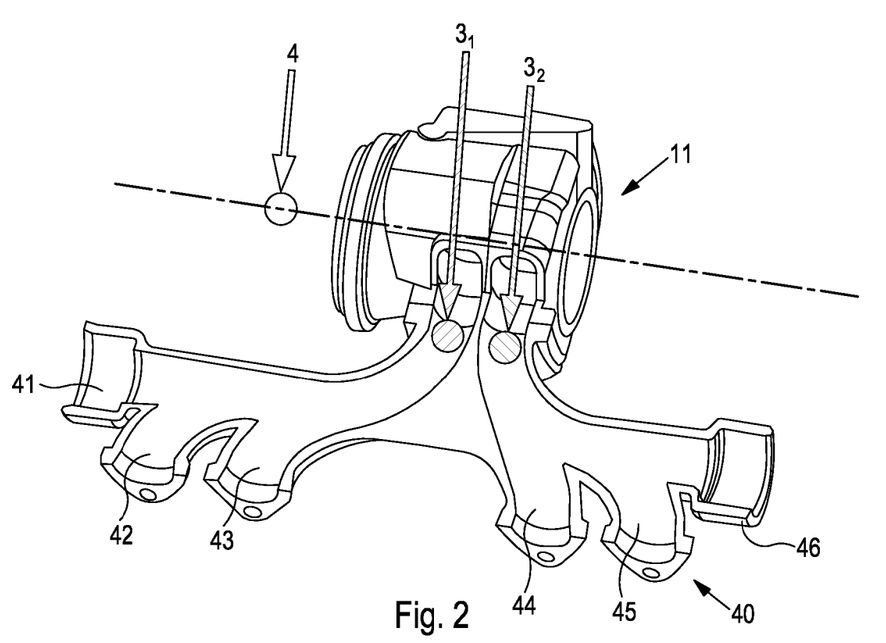
FIG. 2 illustrates how a turbine of the turbocharger of FIG. 1 is conventionally connected to an engine manifold of an internal combustion engine.

FIG. 2 shows the turbine 11 in use (the rest of the turbocharger 1 is omitted), connected to the engine manifold 40 of an engine. A TO (turbine outlet) gas inlet of the turbine 11 in fluid communication with the gas inlet volute 19a is denoted $3_1$, and a BH (bearing housing) gas inlet of the turbine 11 in fluid communication with the gas inlet volute 19b is denoted $3_2$. The engine manifold includes passages 41, 42, 43 for transmitting exhaust gas from a first group of three cylinders of the engine to the gas inlet $3_1$ of the turbine 11, and passages 42, 43, 44 for transmitting exhaust gas from a second group of three cylinders of the engine to the gas inlet $3_2$ of the turbine 11. The reference numeral 4 denotes the turbine outlet.

It is known that through a combustion cycle, the flow entering the exhaust gas inlet volutes 19a, 19b varies.

Figure 3:
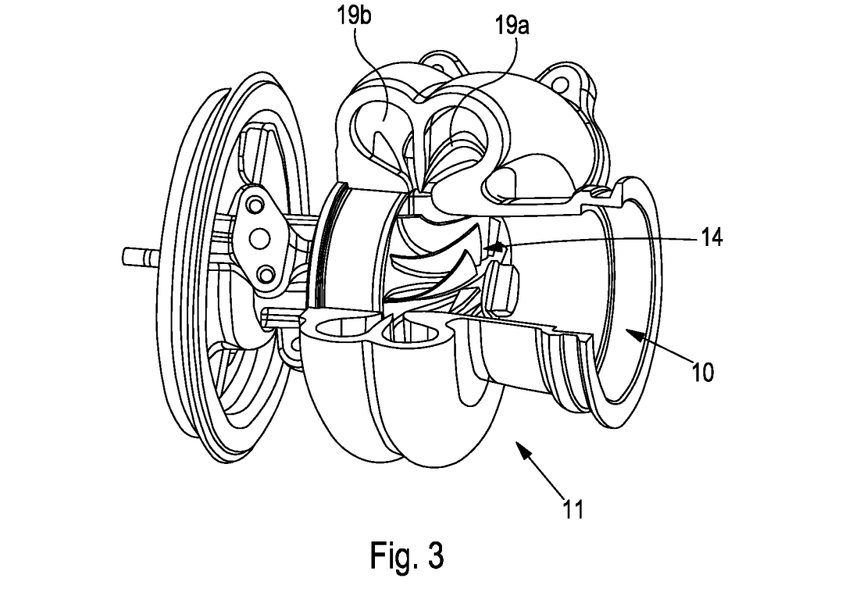
FIG. 3 shows a schematic perspective cut-away view of a portion of a turbine according to the present disclosure.

FIG. 3 shows a schematic perspective partial cut away view of a turbine in accordance with an embodiment of the present disclosure. Features of the turbine which are equivalent to that shown in FIG. 1 share the same numbering.

Figure 4:
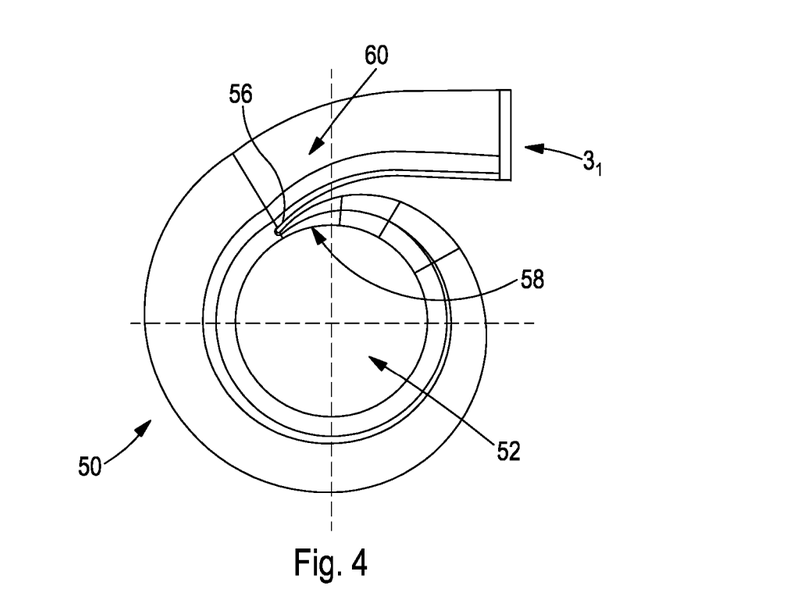
FIG. 4 shows a view of a form which has a shape that corresponds to an internal volume of a volute of the turbine shown in FIG. 3.

FIG. 4 shows a body or form 50 which has the same shape as the internal volume of the volute 19a of the TO gas inlet of the turbine 11. In use, exhaust gas is supplied to the inlet $3_1$ of the volute 19a and is guided by the volute to spiral radially inwards as it follows the volute 19a in an anticlockwise direction. At the end of the volute the exhaust gas flows into the turbine chamber located in the space 52.

Figure 6:
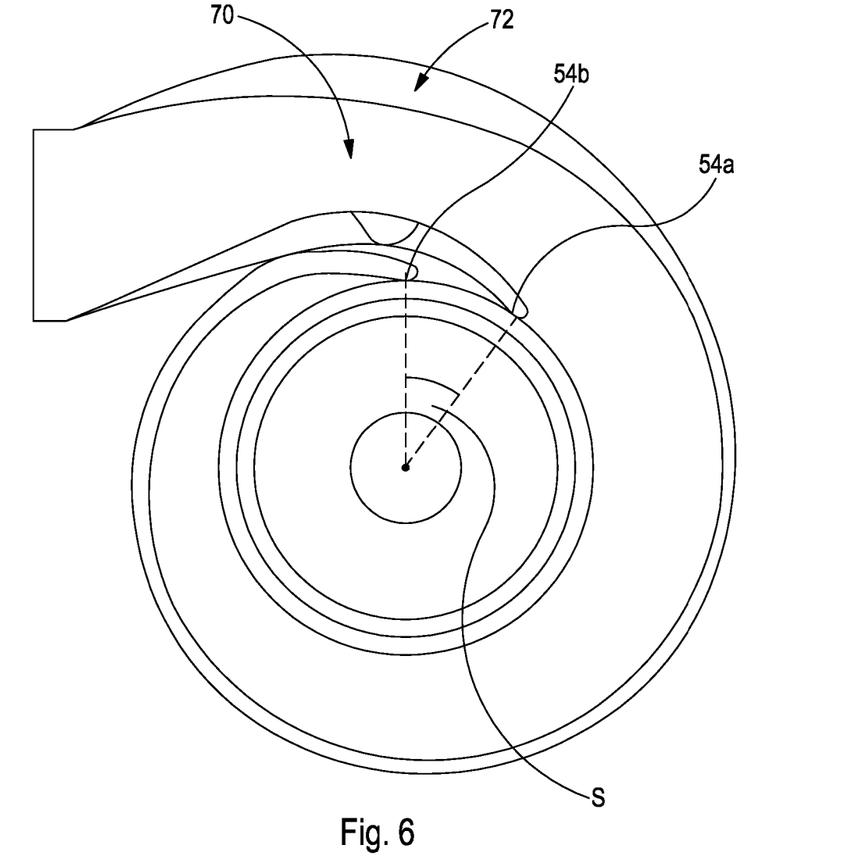
FIG. 6 shows an end-on view of the housing of a turbine according to an embodiment of the present disclosure.

The turbine housing defines the volute 19a such that the housing defines a tongue 54a (shown in FIG. 6). The tongue 54a defines a separation space 56 as shown in FIG. 4. As such it can be seen that the tongue 54a radially separates a downstream portion 58 of the volute 19a adjacent to the turbine chamber (equivalent to space 52) from an upstream portion 60 of the volute 19a adjacent to the inlet $3_1$ of the volute 19a.

Figure 5A:
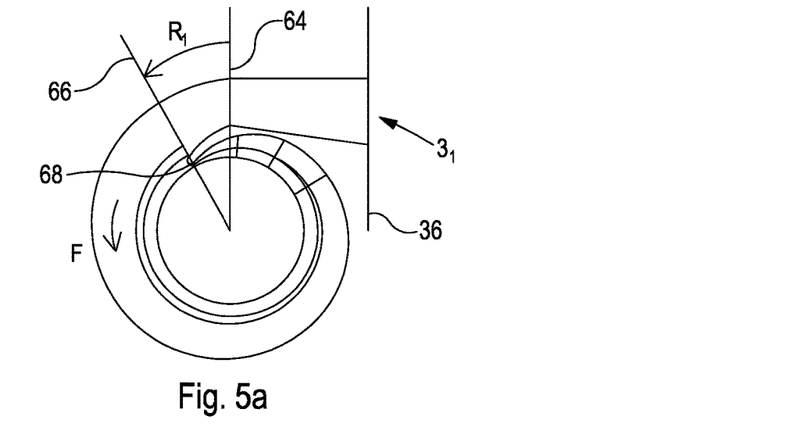
FIGS. 5a-5c, show views of forms which have shapes which correspond to internal volumes of three types of volute having a different turbine scroll tongue overlap parameters.

As will be explained with reference to the FIGS. 5a to 5c, the tongue of an inlet volute may be characterized as having a particular type of turbine scroll tongue overlap. FIG. 5a shows an inlet volute and tongue geometry which is equivalent to that of the volute shown in FIG. 4. FIGS. 5a and 5c show different geometries. These differences are now explained.

The turbine scroll tongue overlap of a particular inlet volute can be defined as follows. The inlet $3_1$ to the volute defines an inlet plane 62. The inlet plane is perpendicular to the direction of exhaust gas flow at the inlet and is generally parallel to the rotation axis of the turbine wheel. A turbine axis plane 64 is defined by the inlet plane 62 in that the turbine axis plane is parallel to the inlet plane 62 and contains the axis of rotation of the turbine wheel. The nature of the turbine scroll tongue overlap of a particular volute can be defined on the basis of the turbine axis plane 64, the location of the tongue relative to the axis of rotation of the turbine wheel and the rotational direction of the exhaust gas as it travels through the volute.

Referring to FIG. 5a, a tongue plane 66 is defined as a plane which contains both the axis of rotation of the turbine wheel and the tip of the tongue of the volute which is located at position 68. If, as is the case in FIG. 5a, the angle of rotation between the turbine axis plane 64 and tongue plane 66 (as indicated by arrow $R_1$) is in a direction which is the same as the rotational flow direction (indicated by F) of the exhaust gas as it travels around the volute, then the inlet volute is said to have a positive turbine scroll tongue overlap.

Figure 5B:
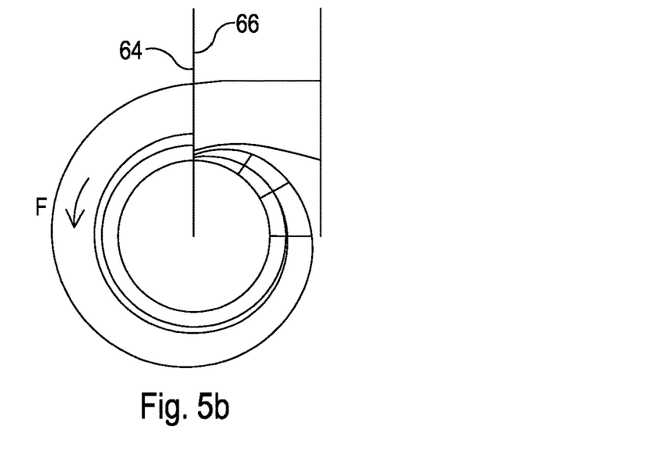
Figure 5C:
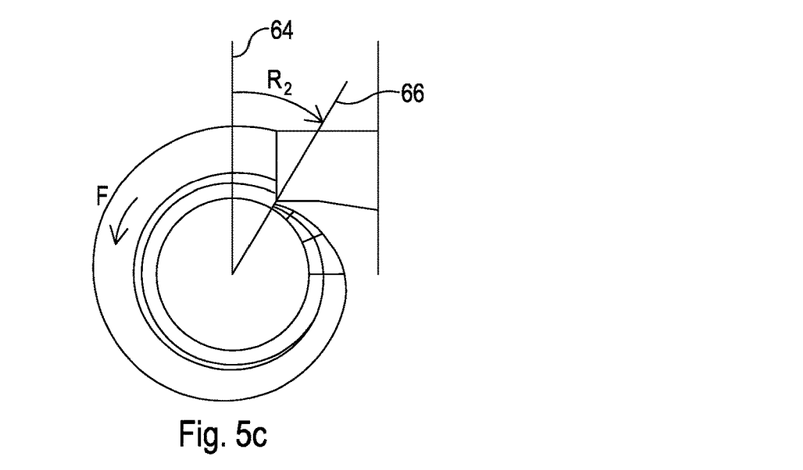

If, as is the case in FIG. 5b, the turbine axis plane 64 and tongue plane 66 are one and the same then the inlet volute is said to have a zero turbine scroll tongue overlap.

If, as is the case in FIG. 5c, the tongue plane 66 is rotated (as shown by $R_2$) about the turbine axis is a direction which is opposite to the direction of rotation (F) of exhaust gas as it travels around the inlet volute, then the turbine inlet volute is said to have a negative turbine scroll tongue overlap.

In a turbine according to the present disclosure both the first inlet volute 19a and second inlet volute 19b must have tongues which are located such that each of the volutes has substantially zero turbine scroll tongue overlap or a positive turbine scroll tongue overlap. The reason for this is that the applicant has determined, based on extensive testing, that a negative turbine scroll tongue overlap affects the performance characteristics of the turbine, whereas a positive turbine scroll tongue overlap (or zero turbine scroll tongue overlap) results in substantially no change in the turbine operating characteristics. This may be particularly important where it is desired to implement the present disclosure by modifying an existing turbine design—by changing the design of the turbine the designer may wish to obtain the later discussed benefits of the present disclosure without causing the performance characteristics of the turbine to be changed.

FIG. 6 shows a schematic end-on view of the turbine housing of a turbine according to the present disclosure. The turbine housing includes a first portion 70 which defines the TO volute 19a, and a second potion 72 which defines the BH volute 19b. The TO volute 19a and BH volute 19b of the twin-entry turbine are spaced along the rotation axis of the turbine wheel. The tongue 54a of the volute 19a and the tongue 54b of the volute 19b can both be clearly seen. The tongue 54a of the volute 19a is angularly spaced about the turbine axis from the tongue 54b of the inlet volute 19b. The angular spacing between the tongues 54a and 54b is indicated by S. Known turbines have tongues which are angularly aligned (i.e. S=0).

It has been found that producing a turbine with first and second turbine inlet volutes which have positive (or zero) turbine scroll tongue overlap and which have tongues which are angularly spaced from one another about the axis of rotation of the turbine wheel results in a turbine in which the turbine wheel experiences less strain, and therefore results in a more reliable turbine within which the turbine wheel is less likely to deform or fracture.

Without wishing to be bound by theory, the reasoning for the reduction in strain experienced by the turbine wheel of a turbine according to the present disclosure is discussed below.

Figure 7A:
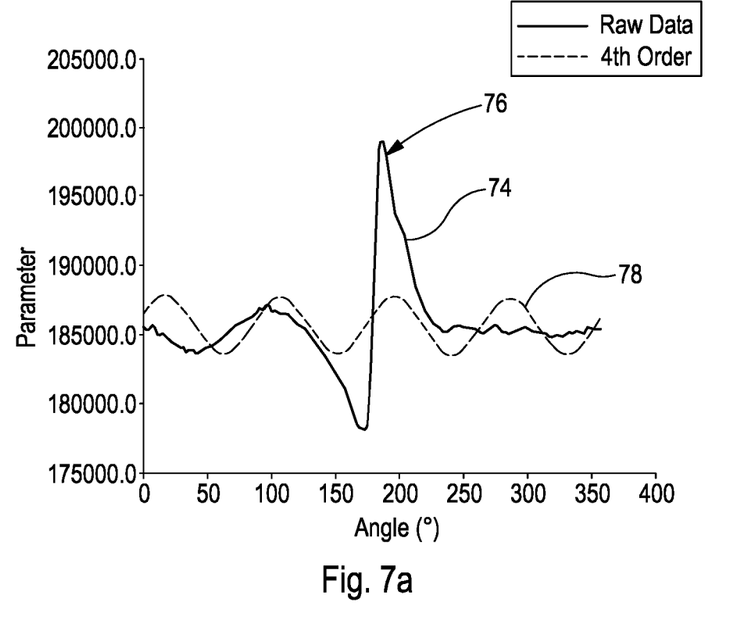
FIGS. 7a and 7b show graphs of the turbine wheel leading edge pressure distribution and fourth order Fourier pressure amplitude (that is, the amplitude of the pressure waveform component being four times the fundamental frequency of the turbine, determined by performing a Fourier transform of the pressure distribution) for a known turbine and a turbine according to an embodiment of the present disclosure.
Figure 7B:
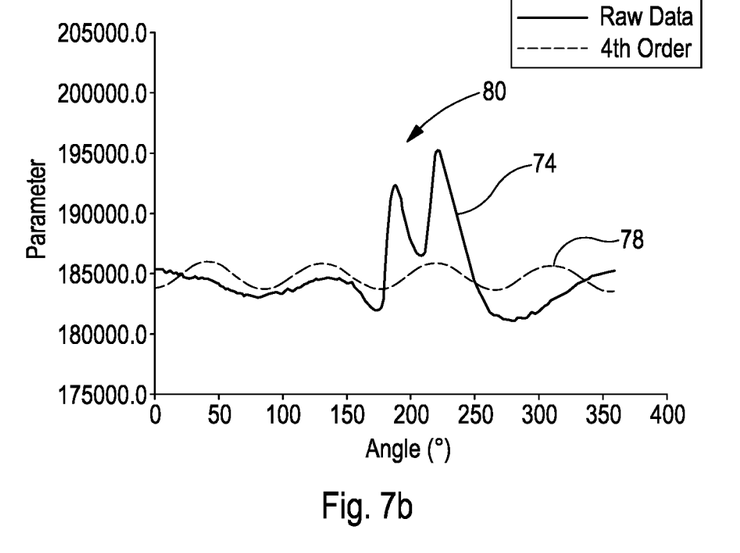

FIGS. 7a and 7b show turbine wheel leading edge pressure distributions for a known twin volute turbine (FIG. 7a) and for a twin entry turbine according to an embodiment of the present disclosure (FIG. 7b).

The only difference between the known twin entry turbine which produces the results shown in FIG. 7a and the twin entry turbine according to the embodiment of the present disclosure, the results of which are shown in FIG. 7b, is that the known turbine has no angular spacing about the first axis between the tongues of the first and second volute (in other words, the tongues of the first and second inlet volutes are rotationally aligned relative to the axis of rotation of the turbine wheel), whereas the turbine according to an embodiment of the present disclosure has tongues of the first and second volute which are angularly spaced about the rotation axis of the turbine wheel by approximately 35°.

The turbine wheel leading edge pressure distribution shown in each of FIGS. 7a and 7b shows the pressure exerted on the turbine wheel by exhaust gas as a function of angular position around the turbine wheel. This is shown in each of the FIGS. 7a and 7b by line 74.

The wheel leading edge pressure distribution 74 of the known turbine shown in FIG. 7a has a single large peak 76 at an angular position of approximately 190 degrees.

The line 78 within FIGS. 7a and 7b shows the pressure amplitudes for the fourth order frequency component of the wheel leading edge pressure distribution. The pressure amplitude in each order of the frequency distribution of the wheel leading edge pressure distribution 74 is obtained in a manner well known in the art, by performing a Fourier transform on the pressure distribution. The pressure amplitude in each order of the frequency distribution of the wheel leading edge pressure distribution is indicative of the energy in each order of the frequency distribution of the wheel leading edge pressure distribution. Greater energy will result in greater force exerted on the blades of the turbine wheel.

The fourth order frequency, which is defined by the operating speed of the turbine wheel is given by 4 times the turbine wheel rotational frequency (i.e. 4 x wheel rotation speed in revolutions/second). In more general terms the $n^{th}$ order frequency in Hz is given by the RPM of the turbine wheel divided by 60n. In general, the higher the order of the frequency component, the lower the operating speed of the turbine wheel which will cause that mode to resonate (or be excited). The greater the pressure amplitude in a particular order, the more strain that will be exerted on the turbine wheel when the turbine wheel is rotating at a speed which causes the particular order to resonate. As previously discussed, the greater the strain on the turbine wheel, the more likely the turbine wheel is to deform or for blades of the turbine wheel to fracture during the operating lifetime of the turbine.

Given the mode one frequency of the turbine discussed in the present example and the range of operating speeds of the turbine, it is the fourth order frequency distribution which is most relevant when determining the strain on the turbine wheel. In other examples another order may be the most relevant order to consider. For example, if the mode one frequency of the turbine is higher, then the contribution of the fifth order or greater may be most relevant, whereas if the mode one frequency of the turbine is lower, then the third order or lower may be the most relevant. The turbine according to the present disclosure (in which the tongues of the inlet volute are angularly offset from one another) will have the below described effect in reducing the pressure amplitude in the frequency order of most concern, regardless of whether this is the third, fourth, fifth or other order based on the mode one frequency of the turbine.

Turning now to FIG. 7b, which shows the wheel leading edge pressure distribution 74 for a turbine according to the present disclosure, it can be seen that the pressure distribution is now bi-modal. That is to say, the single peak 76 present within the pressure distribution for a known turbine has been replaced by the twin-peak structure 80. It is noted that the peaks are separated by an angle which is substantially the same as the 35 degree angle between the tongues of the first and second volutes in the present case.

The bimodal nature of the pressure distribution 74 in the case of a turbine according to the present disclosure results in the amplitude of the fourth order frequency distribution 78 being reduced (as compared to that of the known turbine). This results in a corresponding reduction in the strain experienced by the turbine blades when the turbine wheel is rotated at a speed which corresponds to the resonant frequency of the fourth order.

Figure 8:
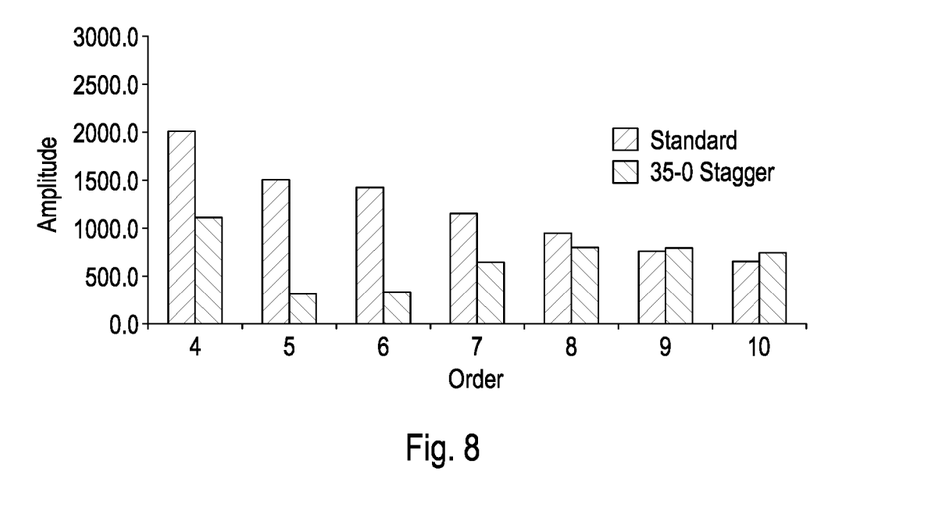
FIG. 8 shows a graph comparing the amplitude of the energy in various orders of frequency distribution of the turbine wheel leading edge pressure distributions shown in FIG. 7, for both a known turbine and one according to an embodiment of the present disclosure.

FIG. 8 shows the amplitude of the pressure in each order frequency component for a known turbine and turbine according to the present disclosure in which the tongues of the first and second volutes are angularly spaced about the turbine wheel axis by 35 degrees. For each order shown the bar on the left shows the amplitude of the pressure in the order for the known turbine, whereas the bar on the right shows the amplitude of pressure in that order for the turbine according to the present disclosure.

As can be seen from the graph, the turbine according to the present disclosure has a reduced pressure amplitude as compared to the known turbine for each of the fourth, fifth, sixth, seventh and eighth orders. This means that if the turbine wheel according to the present disclosure is operated at a speed which excites one of these orders, the strain on the turbine wheel will be less as compared to that for a known turbine.

The effect of the extra peak 80 within the wheel leading edge pressure distribution 74 of a turbine according to the present disclosure, as compared to the single peak of the pressure distribution for a known turbine, is to reduce the pressure amplitude in each of the frequency component orders discussed above, by simultaneously increasing the amplitude of the pressure in the higher frequency component orders. For example, it can be seen in FIG. 8 that the pressure amplitude in the ninth and tenth orders for a turbine according to the present disclosure is greater than that for a known turbine. However, as already discussed, the higher the order of a frequency component, the lower the turbine speed required to excite that order. It follows that increasing the amplitude of the excitation in higher orders of the frequency distribution is of limited concern because these correspond to relatively low operating speeds of the turbine, which are much lower than the speeds at which the turbine wheel will normally operate.

It will be appreciated that whilst in relation to the presently described turbine, the fourth order component of the frequency distribution of the wheel leading edge pressure distribution is that which is of greatest concern in relation to strain on the turbine wheel, in other embodiments it may be a different order frequency component. Using the analysis described above, it is possible to model the wheel leading edge pressure distribution for any given turbine, determine the order of the frequency component which is of greatest concern in relation to turbine blade strain and tune the exact angular separation between the tongue of the first inlet volute and that of the second inlet volute so as to provide the maximum reduction in the amplitude of the excitation of the relevant order of frequency component. In the presently described embodiment the ideal offset for reducing the pressure amplitude in the fourth order has been determined to be 35°. In other embodiments the angular separation between the tongues of the first and second inlet volutes may be any appropriate separation.

In light of the above a turbine according to the present disclosure provides a substantially performance transparent way in which to reduce the strain on the blades of a turbine. This in turn improves the operating lifetime of the turbine.

Although the disclosure has been described in relation to a turbine which may form part of a turbocharger, in other embodiments the turbine may form part of any appropriate turbomachine.

Furthermore, although the disclosure has been described in relation to a twin entry turbine (i.e. one with two volutes), it may equally be applied to turbines having more than two volutes.

The invention claimed is:

1. A turbine comprising:
    a housing defining a turbine chamber within which a turbine wheel is supported for rotation about a first axis;
    the housing further defining first and second inlet volutes which are speced from one another along the first axis and which each spiral radially inwards and extend from a respective inlet to adjoin the turbine chamber;
    wherein the housing further defines a volute tongue for each of the first and second inlet volutes, the tongue of the first inlet volute radially separating a downstream portion of the first inlet volute adjacent the turbine chamber from an upstream portion of the first inlet volute adjacent said inlet of the first inlet volute, and the tongue of the second inlet volute radially separating a downstream portion of the second inlet volute adjacent the turbine chamber from an upstream portion of the second inlet volute adjacent said inlet of the second inlet volute;
    wherein the tongues of each of the first and second inlet volutes have a turbine scroll tongue overlap which is substantially zero or positive; and
    wherein the tongue of the first inlet volute is angularly spaced about the first axis from the tongue of the second inlet volute.

2. A turbine according to claim 1, wherein the tongue of the first inlet volute has a turbine scroll tongue overlap which is zero and the tongue of the second inlet volute has a turbine scroll tongue overlap which is positive.

3. A turbine according to claim 1, wherein the second inlet volute is located closer to a turbine outlet of the turbine than the first inlet volute.

4. A turbine according to claim 1, wherein the tongue of the first inlet volute is angularly spaced about the first axis from the tongue of the second inlet volute by 35°.

5. A turbocharger comprising a turbine according to claim 1.

\* \* \* \* \*